United States Patent
Takayama et al.

(10) Patent No.: US 8,693,839 B2
(45) Date of Patent: Apr. 8, 2014

(54) IMAGE RECORDING APPARATUS AND IMAGE RECORDING CONTROL METHOD

(75) Inventors: Yuji Takayama, Kanagawa (JP); Kiyoshi Yamauchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/350,111

(22) Filed: Jan. 13, 2012

(65) Prior Publication Data

US 2012/0189286 A1     Jul. 26, 2012

(30) Foreign Application Priority Data

Jan. 21, 2011   (JP) ................................ 2011-010782

(51) Int. Cl.
| | | |
|---|---|---|
| *H04N 5/932* | (2006.01) | |
| *H04N 5/935* | (2006.01) | |
| *H04N 5/77* | (2006.01) | |
| *H04N 9/80* | (2006.01) | |
| *H04N 5/76* | (2006.01) | |
| *H04N 5/92* | (2006.01) | |

(52) U.S. Cl.
USPC ........... 386/201; 386/221; 386/224; 386/239; 386/248; 386/235; 386/337

(58) Field of Classification Search
USPC .......... 386/200–234, 239–248, 278–290, 338
See application file for complete search history.

(56) References Cited

U.S. PATENT DOCUMENTS

| | | | |
|---|---|---|---|
| 4,864,431 A * | 9/1989 | Murase ........................... | 360/15 |
| 6,366,630 B1 * | 4/2002 | Okuyama ...................... | 375/356 |
| 7,161,883 B2 * | 1/2007 | Shiozawa et al. ............. | 369/53.2 |
| 7,853,119 B2 * | 12/2010 | Moors et al. ................. | 386/291 |
| 2002/0154245 A1 * | 10/2002 | Kitamura ...................... | 348/465 |

FOREIGN PATENT DOCUMENTS

| | | |
|---|---|---|
| JP | 2006-163640 | 6/2006 |
| JP | 2006-262194 | 9/2006 |
| JP | 2008-72236 | 3/2008 |

* cited by examiner

*Primary Examiner* — Hung Dang
(74) *Attorney, Agent, or Firm* — Frommer Lawrence & Haug LLP; William S. Frommer

(57) ABSTRACT

An image recording apparatus includes: a recording process section recording an image on a recording medium; an output process section outputting the image; and a control section multiplexing information on timing for starting the recording of the image with the image output from the output process section before the recording process section starts recording the image on the recording medium.

12 Claims, 12 Drawing Sheets

FIG.8

| VITC BIT NO. | VALUE (WEIGHT) | HOUR INFORMATION DATA |
|---|---|---|
| 0 | 1 | VITC SYNC BITS |
| 1 | 0 | |
| 2 | (1) | FRAME UNITS |
| 3 | (2) | |
| 4 | (4) | |
| 5 | (8) | |
| 6 | (LSB) | |
| 7 | : | |
| 8 | : | |
| 9 | (MSB) | |
| 10 | 1 | VITC SYNC BITS |
| 11 | 0 | |
| 12 | (10) | FRAME TENS |
| 13 | (20) | |
| 14 | FLAG | FLAG |
| 15 | FLAG | FLAG |
| 16 | (LSB) | |
| 17 | : | |
| 18 | : | |
| 19 | (MSB) | |
| 20 | 1 | VITC SYNC BITS |
| 21 | 0 | |
| 22 | (1) | SECOND UNITS |
| 23 | (2) | |
| 24 | (4) | |
| 25 | (8) | |
| 26 | (LSB) | |
| 27 | : | |
| 28 | : | |
| 29 | (MSB) | |
| 30 | 1 | VITC SYNC BITS |
| 31 | 0 | |
| 32 | (10) | SECOND TENS |
| 33 | (20) | |
| 34 | (40) | |
| 35 | FLAG | FLAG |
| 36 | (LSB) | |
| 37 | : | |
| 38 | : | |
| 39 | (MSB) | |

- Bits 6–9: FOUR LEAST SIGNIFICANT BITS of DATA0
- Bits 16–19: FOUR MOST SIGNIFICANT BITS of DATA0
- Bits 26–29: FOUR LEAST SIGNIFICANT BITS of DATA1
- Bits 36–39: FOUR MOST SIGNIFICANT BITS of DATA1

| VITC BIT NO. | VALUE (WEIGHT) | HOUR INFORMATION DATA |
|---|---|---|
| 40 | 1 | VITC SYNC BITS |
| 41 | 0 | |
| 42 | (1) | MINUTE UNITS |
| 43 | (2) | |
| 44 | (4) | |
| 45 | (8) | |
| 46 | (LSB) | |
| 47 | : | |
| 48 | : | |
| 49 | (MSB) | |
| 50 | 1 | VITC SYNC BITS |
| 51 | 0 | |
| 52 | (10) | MINUTE TENS |
| 53 | (20) | |
| 54 | (40) | |
| 55 | FLAG | FLAG |
| 56 | (LSB) | |
| 57 | : | |
| 58 | : | |
| 59 | (MSB) | |
| 60 | 1 | VITC SYNC BITS |
| 61 | 0 | |
| 62 | (1) | HOUR UNITS |
| 63 | (2) | |
| 64 | (4) | |
| 65 | (8) | |
| 66 | (LSB) | |
| 67 | : | |
| 68 | : | |
| 69 | (MSB) | |
| 70 | 1 | VITC SYNC BITS |
| 71 | 0 | |
| 72 | (10) | HOUR TENS |
| 73 | (20) | |
| 74 | FLAG | FLAG |
| 75 | FLAG | FLAG |
| 76 | (LSB) | |
| 77 | : | |
| 78 | : | |
| 79 | (MSB) | |
| 80 | 1 | VITC SYNC BITS |
| 81 | 0 | |

- Bits 46–49: FOUR LEAST SIGNIFICANT BITS of DATA2
- Bits 56–59: FOUR MOST SIGNIFICANT BITS of DATA2
- Bits 66–69: FOUR LEAST SIGNIFICANT BITS of DATA3
- Bits 76–79: FOUR MOST SIGNIFICANT BITS of DATA3

FIG.9

| REC SEQUENCE (BIT 5.4) | REC SEQUENCE COUNTER (BIT 2.0) | DESCRIPTION | |
|---|---|---|---|
| 0x3 | 0x7 | STOP | STOP STATE |
| 0x1 | 0x7 | PRE REC (TAPE START RUN) | START PREPARATION FOR RECORDING |
| 0x1 | 0x7 | | |
| 0x1 | 0x7 | ... | |
| 0x1 | 0x7 | | |
| 0x1 | 0x6 | COUNT DOWN START | COUNT DOWN TO START RECORDING |
| 0x1 | 0x5 | | |
| 0x1 | 0x4 | | |
| 0x1 | 0x3 | | |
| 0x1 | 0x2 | | |
| 0x1 | 0x1 | | |
| 0x0 | 0x0 | RECORDING | RECORDING IN PROGRESS |
| 0x0 | 0x0 | ... | |
| 0x3 | 0x7 | STOP | RECORDING IS TERMINATED |

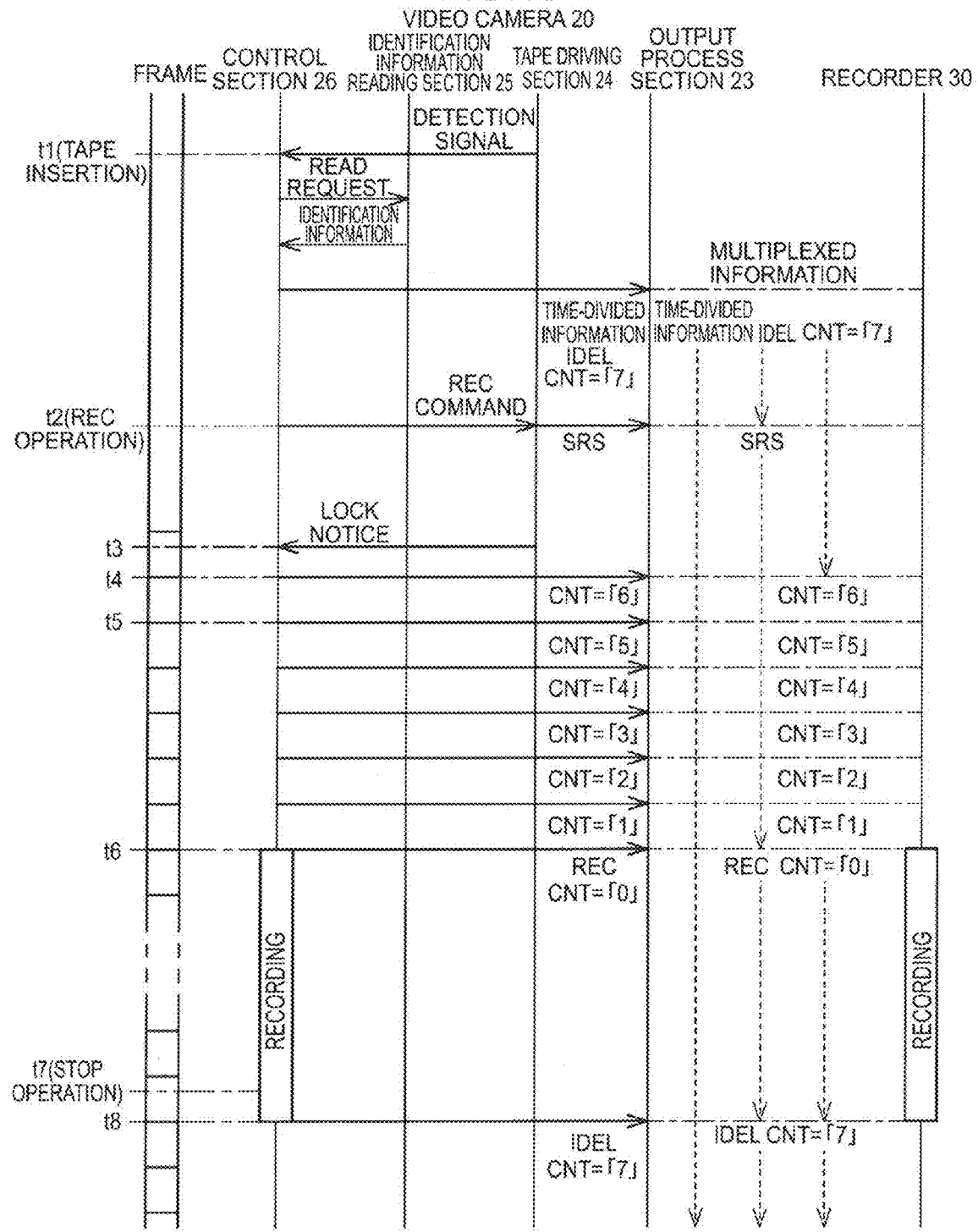

IMAGE RECORDING APPARATUS AND IMAGE RECORDING CONTROL METHOD

FILED

The present disclosure relates to an image recording apparatus and an image recording control method. More particularly, according to the present disclosure, when an image is recorded using an imaging apparatus or the like, the same image can be synchronously recorded by another image recording apparatus.

BACKGROUND

According to the related art, when an image is recorded using a video camera (camcorder), the image recorded by the video camera can be also recorded by another image recording apparatus. For example, according to JP-A-2006-262194 (Patent Document 1), when a report on a certain event is provided by a reporter of a broadcast station acting as a representative, a "start recording" command and a "stop recording" command may be output by multiplexing them with a signal representing an image of the event recorded by a video camera. The same image can be recorded by video tape recorders of other broadcast stations in conjunction with the recording carried out by the representative by controlling the operation of the video tape recorders based on the commands multiplexed with the image. A report on an event is provided by a representative broadcast station as follows. One broadcast station is selected as a representative broadcast station from among a plurality of broadcast stations, and a cameraman of the representative broadcast station visits the site of the event of interest carrying a video camera. In the meantime, video tape recorders are prepared at the other broadcast stations to allow an image shot and recorded by the cameraman of the representative broadcast station with the video camera to be distributed to and recorded by the video tape recorders of the other broadcast stations.

SUMMARY

When the operation of an image recording apparatus is controlled based on a "start recording" command and "stop recording" command multiplexed with an image from a video camera, an image recorded by the image recording apparatus may be different from the image recorded by the video camera in terms of timing. For example, control over a recording operation at the image recording apparatus for recording the image output from the video camera is started when the "start recording" command is received. Therefore, if a certain time passes before the recording of the image is actually started after the reception of the "start recording" command, the image recording apparatus starts recording the image at timing later than the timing at which the video camera starts recording the image.

Under the circumstance, it is desirable to provide an image recording apparatus and an image recording control method which allow an image to be recorded by a plurality of image recording apparatus in a synchronous manner.

An embodiment of the present disclosure is directed to an image recording apparatus including a recording process section recording an image on a recording medium, an output process section outputting the image, and a control section multiplexing information on timing for starting the recording of the image with the image output from the output process section before the recording process section starts recording the image on the recording medium.

According to the embodiment of the present disclosure, information on timing for starting recording of an image may be multiplexed with a video signal in compliance with the serial digital interface standard before the recording processing section starts recording the image on the recording medium. For example, the recording start timing information may be information indicating a period to precede the recording of the image or information indicating the number of frames of the image updated as time passes before the recording of the image is started. The recording start timing information may include information indicating that the apparatus is in a state of preparation for recording the image. The recording start timing information may be multiplexed with a blanking period of the video signal using, for example, a user bit area of time code information multiplexed with the blanking period. Information indicating the termination of the recording of the image may be multiplexed when the recording of the image on the recording medium is terminated. Further, unique identification information set for the recording medium for recording the image may be read, and time-divided information generated from the identification information may be multiplexed with the image.

Another embodiment of the present disclosure is directed to an image recording control method including: recording an image on a recording medium; outputting the image; and multiplexing information on timing for starting the recording of the image with the output image before the recording of the image on the recording medium is started.

Still another embodiment of the present disclosure is directed to an image recording apparatus including: an input process section extracting recording start timing information multiplexed with an input image, the information indicating timing for starting the recording of the image at the apparatus which has output the image; a recording process section recording the input image in a recording medium; and a control section controlling the operation of the recording process section based on the recording start timing information extracted by the input process section to record the input image in the recording medium in synchronism with the image recording operation of the apparatus which has output the image.

Yet another embodiment of the present disclosure is directed to an image recording control method including: extracting recording start timing information multiplexed with an input image, the information indicating timing for starting the recording of the image at the apparatus which has output the image; recording the input image in a recording medium; and recording the input image in the recording medium in synchronism with the image recording operation of the apparatus which has output the image, based on the extracted recording start timing information.

According to the embodiments of the present disclosure, the image recording apparatus for recording and outputting an image in and from the recording medium outputs an image along with information on the timing for starting recording of the image multiplexed therewith before starting to record the image on a recording medium. When the image multiplexed with the recording start timing information is input to another imaging recording apparatus, the image recording apparatus starts recording the image in a recording medium in synchronism with the image recording operation of the apparatus which has output the image based in the recording start timing information multiplexed with the image. Thus, when an image is recorded by a plurality of apparatuses, the apparatuses can record the image in synchronism with each other.

BRIEF DESCRIPTION OF THE DRAWINGS

FIG. 8 is an illustration showing a configuration of a VITC;

FIG. 9 shows exemplary values that data "DATA2" has during the period from the beginning of recording until the end of recording;

FIG. 13 is a diagram showing an exemplary sequence of operations from the beginning of image recording until the end of recording.

DETAILED DESCRIPTION

An embodiment of the present disclosure will now be described. The following items will be described in the order listed.

1. Configuration of Image Recording System
2. Configuration of Video Camera
3. Configuration of Recorder
4. Video Data Recording Operation
5. Operation of Recording Non-Image. Data
6. Exemplary Sequence of Operations from Beginning of Recording up to End of Recording <1. Configuration of Image Recording System>

Figure 1:
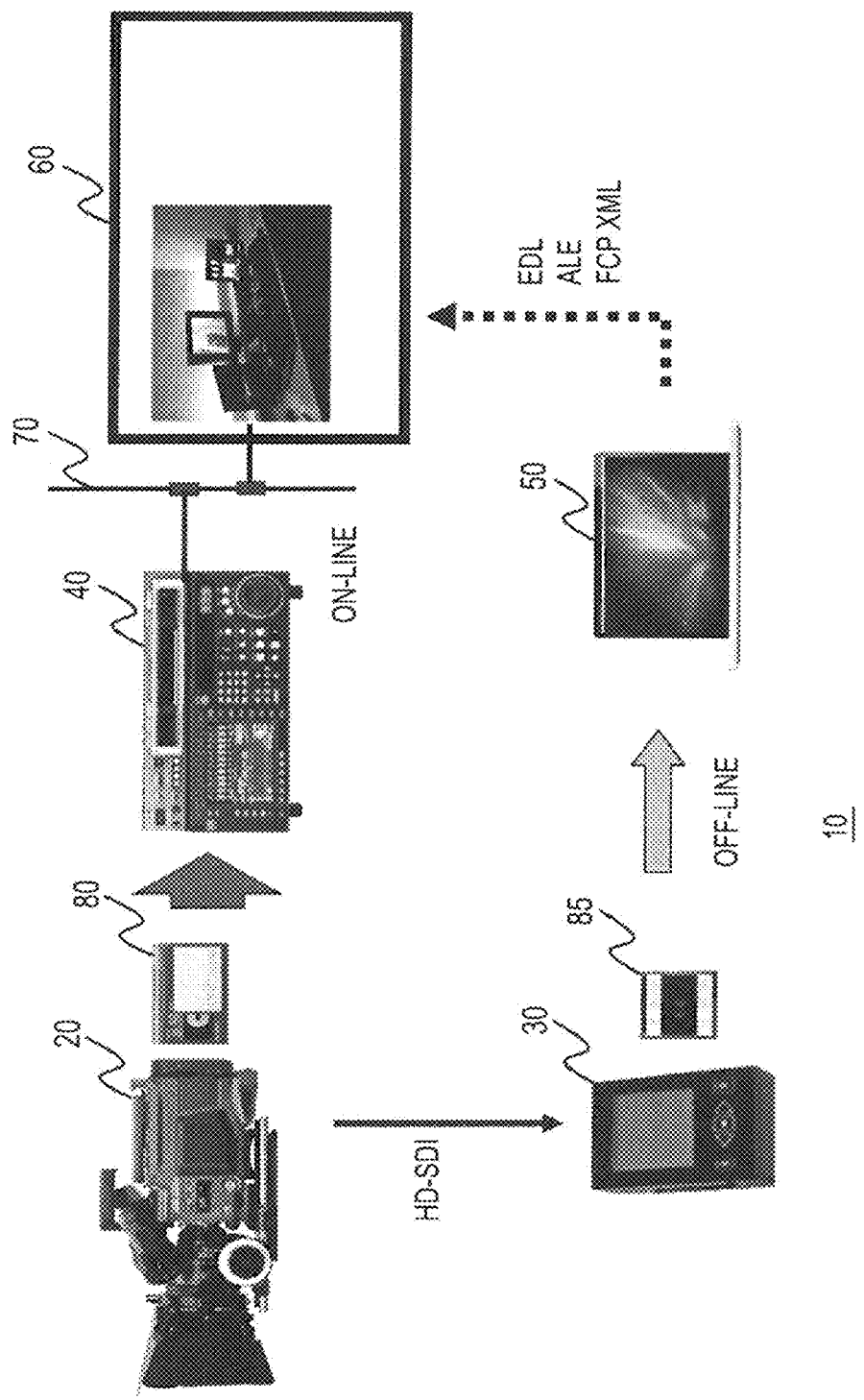
FIG. 1 is images showing a configuration of an image recording system.

FIG. 1 shows an exemplary configuration of an image recording system employing image recording apparatus according to an embodiment of the present disclosure. An image recording system 10 includes a video camera (camcorder) 20 and a recorder 30. The video camera 20 is an image recording apparatus which records images on a recording medium mounted therein, e.g., a video tape 80 and outputs the recorded images The recorder 30 is an image recording apparatus which records images output from the video camera 20 in a recording medium mounted therein, e.g., a memory card 85.

For example, when editing operations are to be carried out using the image recording system 10, a video tape reorder 40 and editing apparatus 50 and 60 may be included in the system.

The video tape recorder 40 is connected to the editing apparatus 60 through a network 70. The video tape recorder 40 reproduces images recorded on the video tape 80 and supplies the images to the editing apparatus 60 through the network 70.

The editing apparatus 50 generates list data to be used for a process of editing, i.e., selecting and combining images recorded in the memory card 85. For example, images recorded in the memory card 85 are reproduced to determine IN- and OUT-points of those images, and list data such as EDL (Edit Decision List) and ALE (AVID Log Exchange) representing those positions and the like. Further, an XML file is generated using Final Cut Pro (registered trademark).

The editing apparatus 60 corrects the quality and tone of images utilizing images reproduced by the video tape recorder 40. Further, the editing apparatus 60 selects and combines images based on the list data generated by the editing apparatus 50 to generate edited image data.

As thus described, the video camera 20 records images on the video tape 80 mounted therein and outputs the images, and the recorder 30 records the images output from the video camera 20 in the memory card 85 mounted therein. It is therefore possible to generate list data using the images recorded in the memory card 85 and to perform a process of correcting the images recorded on the video tape 80 in parallel. Thus, an editing operation can be carried out efficiently.

In order to achieve synchronization between the images recorded on the video tape 80 mounted in the video camera 20 and the images recorded in the memory card 85 mounted in the recorder 30, the video camera 20 outputs the images along with information associated with the recording of the images on a multiplex basis before starting to record the images on the video tape 80.

The recorder 30 starts recording the input images in the recording medium in synchronism with the operation of recording images using the video camera 20, based on the information input along with the images on a multiplex basis. Thus, the video camera 20 and the recorder 30 record images in synchronism with each other.

<2. Configuration of Video Camera>

Figure 2:
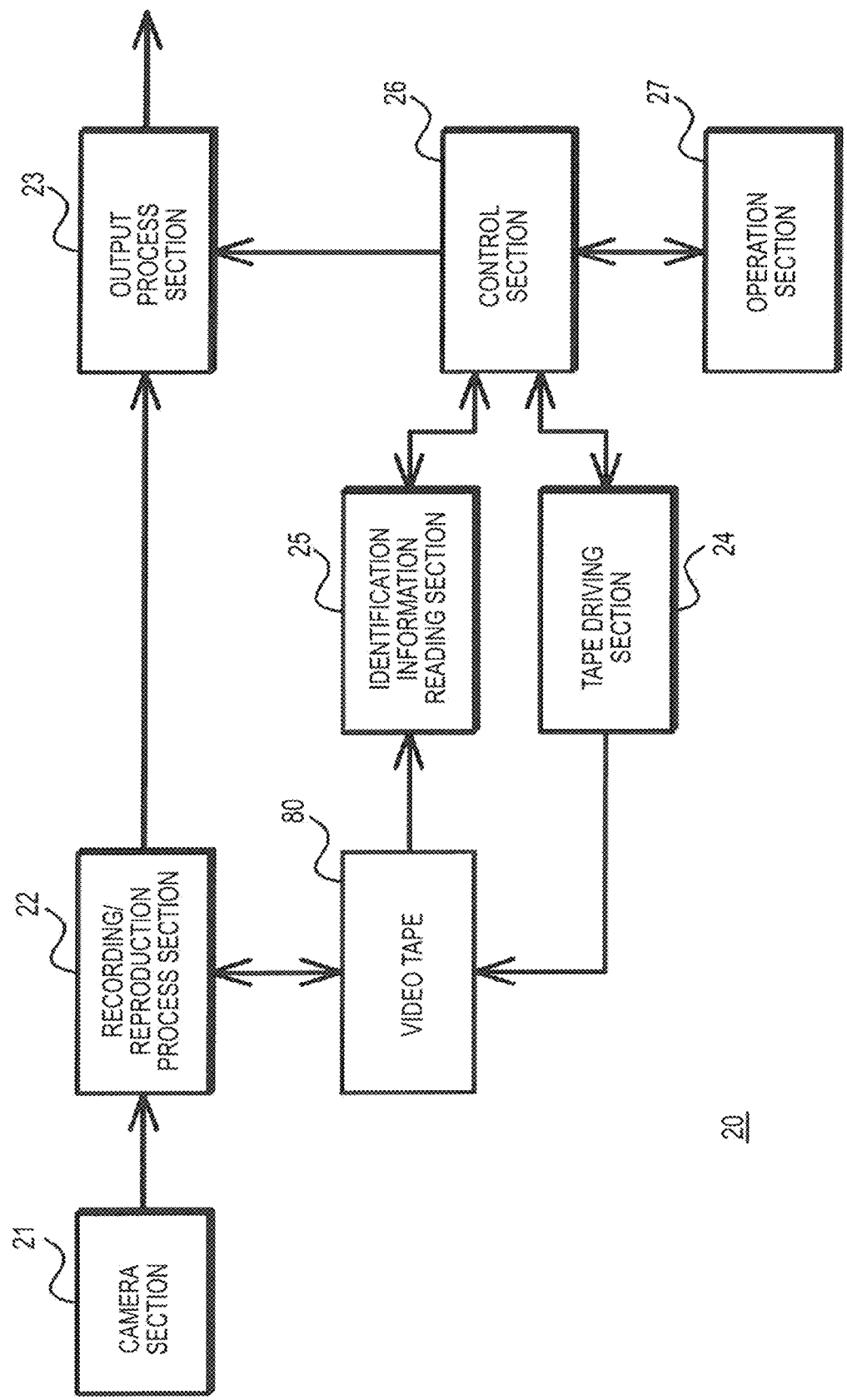
FIG. 2 is a diagram showing a configuration of a video camera.

FIG. 2 shows a configuration of the video camera 20. The video camera 20 includes a camera section 21, a recording/reproduction process section 22, an output process section 23, a tape driving section 24, an Identification information reading section 25, a control section 26, and an operation section 27.

The camera section 21 includes an imaging optical system, an imaging element, and a camera signal processing portion. The imaging optical system of the camera section forms an optical image having desired luminance on an imaging surface of the imaging element. The imaging element performs photoelectric conversion to generate an imaging signal associated with the optical image formed on the imaging surface. The camera signal processing portion generates video data by performing various types of camera signal processing on the imaging signal, the processes performed by the portion including noise elimination, A-D conversion, knee correction and gamma correction, and white balance adjustment.

The recording/reproduction process section 22 performs a recording process for recording video data generated by the camera section 21 on the video tape 80. The recording/reproduction process section 22 also performs a process of reproducing video data recorded on the video tape 80.

The output process section 23 outputs video data generated by the camera section 21 after converting it into a predetermined format. For example, the output process section 23 outputs the video data to the recorder 30 as an HD-SDI (Serial Digital Interface) signal in compliance with the Serial Digital Interface standard. The output process section 23 also outputs information supplied from the control section 26 which will be described later along with the HD-SDI signal on a multiplex basis.

The tape driving section 24 drives the video tape 80 based on control signals supplied from the control section 26. The Tape driving section 24 monitors the state of the tape while driving the same and outputs a lock notice to the control section 26 when the video tape 80 is being driven at a predetermined tape traveling speed. Further, the tape driving section 24 determines whether the video tape 80 is mounted in place or not and outputs information on the result of detection to the control section 26.

The identification information reading section 25 reads identification information uniquely set for the video tape 80 and outputs the identification information to the control section 26. For example, when the video tape 80 is provided with a contactless IC tag for enabling short-range radio communication, the identification information reading section 25 communicates with the contactless IC tag on a wireless basis to read the identification information uniquely set for the video tape 80, and the identification information is output to the control section 26. The identification information uniquely set for the video tape may be acquired using methods other than short-range radio communication. For example, the identification information may be represented by a bard code to allow the information to be optically read. Further, the reading of the information is not limited to contactless methods, and contact type reading methods may be used.

The operation section 27 is connected to the control section 26. The operation section 27 includes a power switch, a recording start/stop switch, and various operational switches for making operation setups of the video camera 20. The operation section 27 generates operation signals associated with switch operations performed by a user and outputs the signals to the control section 26.

The control section 26 is constituted by a microcomputer or the like. The control section 26 generates control signals based on operation signals supplied from the operation section 27 and supplies the signals to various parts of the video camera such that the video camera 20 operates according to operations performed by a user. When an image is to be recorded on the video tape 80, the control section 26 generates information associated with the recording of the image and supplies it to the output processing section 23 before the recording of the image is started. Thus, the information is provided along with an HD-SDI signal of the image on a multiplex basis and the image can be recorded by the recorder 30 based on the information provided on a multiplex basis, in synchronism with the recording of the image on the video tape. For example, the information associated with the recording of the image provided by the control section 26 on a multiplex basis may be information associated with timing for starting the recording of the image, e.g., a period to precede the recording of the image. Further, the control section 26 provides identification information uniquely set for a recording medium to be used for recording the image, e.g., the identification information unique to the tape read out by the identification information reading section 25 on a multiplex basis.

<3. Configuration of Recorder>

Figure 3:
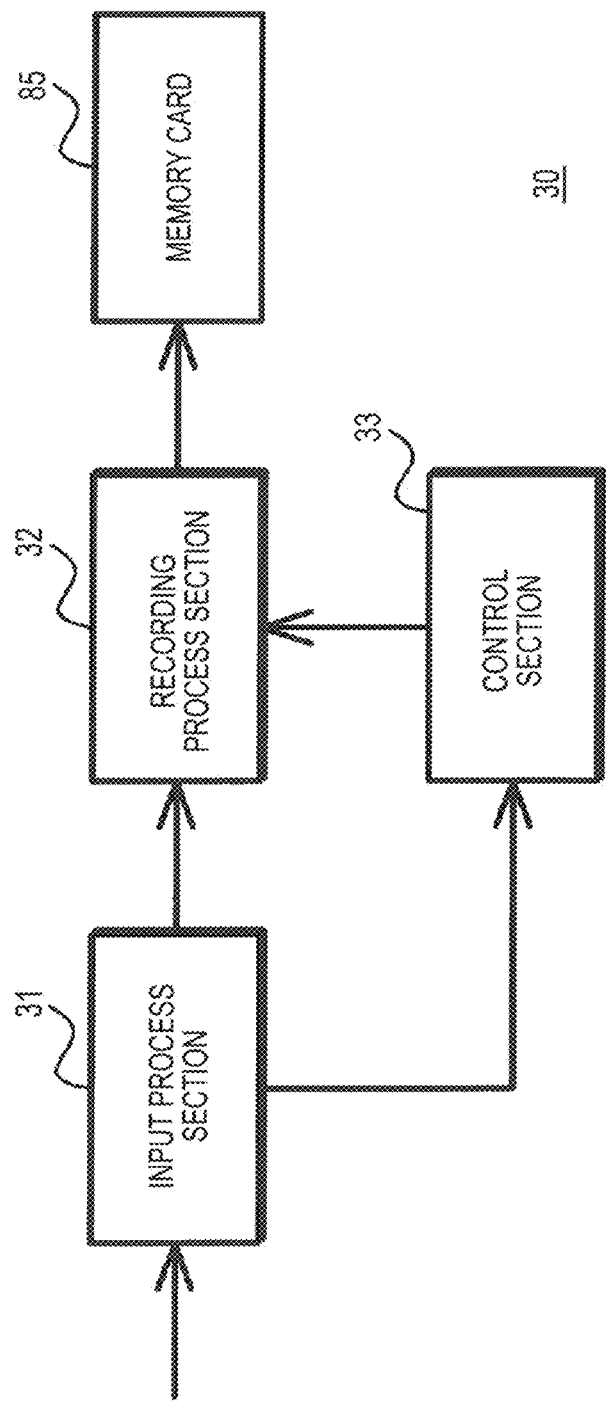
FIG. 3 is a diagram showing a configuration of a recorder.

FIG. 3 shows a configuration of the recorder 30. The recorder 30 includes an input process section 31, a recording process section 32, and a control section 33.

The input process section 31 extracts the information output along with the HD-SDI signal from the video camera 20 on a multiplex basis and outputs the information to the control section 33. Image data is also extracted from the HD-SDI signal and output to the recording process section 32.

The recording process section 32 performs a process of recording the image supplied from the input process section 31 in the memory card 85 based on a control signal supplied from the control section 33.

The control section 33 supplies a control signal generated based on the information extracted by the input process section 31 to the recording process section 32 to control recording of the image in the memory card 85. For example, the control section 33 makes preparations or recording the image in the memory card 85 based on the information extracted by the input process section 31 and thereafter records the image in the memory card 85 in synchronism with the recording of the image on the video tape 80 performed by the video camera 20. The control section 33 also exercises control such that the identification information unique to the tape included in the extracted information is recorded in the memory card 85 in association with the image input to the same.

<4. Video Data Recording Operation>

Figure 4:
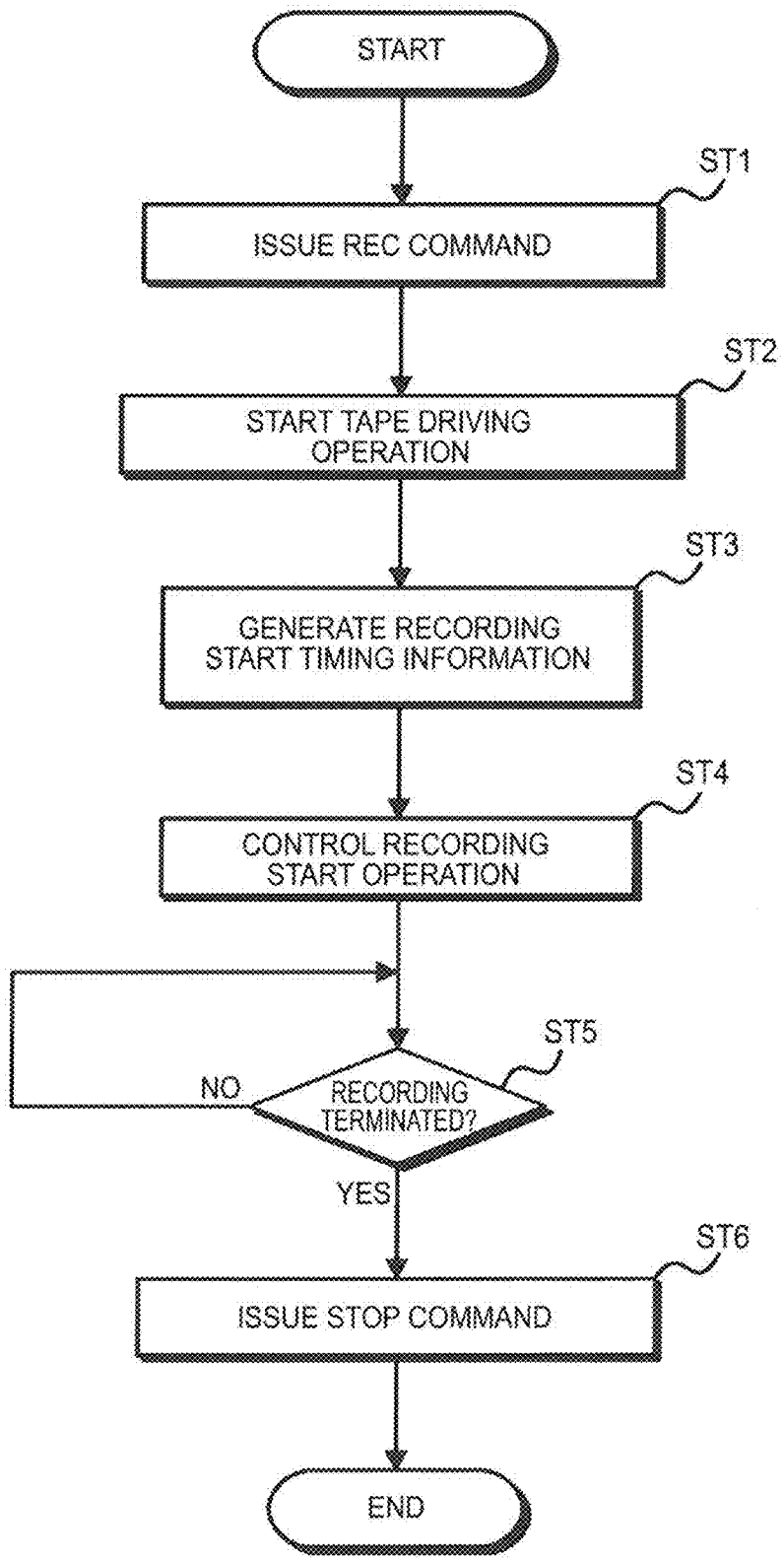
FIG. 4 is a flow chart showing operations of the video camera performed when an image is recorded on a video tape and a memory card in synchronism.
Figure 5:
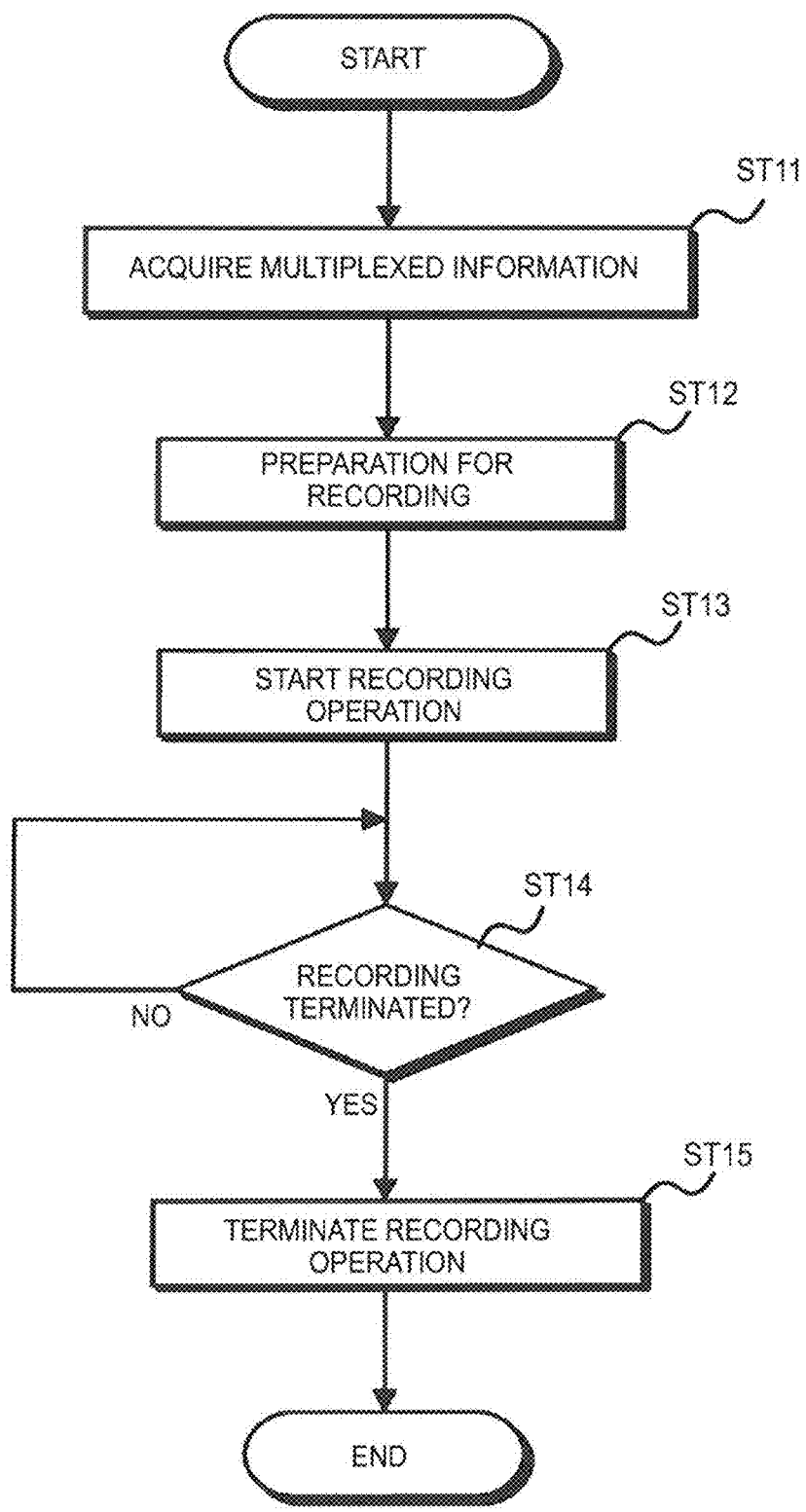
FIG. 5 is a flow chart showing operations of the recorder performed when an image is recorded on a video tape and a memory card in synchronism.

FIG. 4 is a flow chart showing operations performed by the video camera 20 when an image is recorded in the video tape 80 and the memory card 85 synchronously. FIG. 5 is a flow chart showing operations performed by the recorder 30 when an image is recorded in the video tape 80 and the memory card 85 synchronously. In the following description, a signal output from the video camera 20 to the recorder 30 will be referred to as "HD-SDI signal".

When the "record" switch of the operation section 27 of the video camera 20 is operated, the control section 26 issues a "REC" command at step ST1. When it is determined that recording has started from an operation signal supplied by the operation section 27, the control section 26 supplies the "REC" command to the tape driving section 24 and proceeds to step ST2.

At step ST2, the tape driving section 24 starts a tape driving operation. In response to the "REC" command issued as thus described, the tape driving section 24 starts an operation of driving the video tape 80. When the video tape 80 enters a locked state in which the tape is driven at a predetermined tape traveling speed, the tape driving section 24 outputs a lock notice to the control section 26 to indicate that the tape is in the locked state, and the flow proceeds to step ST3.

At step ST3, the control section 26 generates recording start timing information. The control section 26 generates the recording start timing information when the lock notice is supplied to the same from the tape driving section 24. The control section 26 determines that the image can be recorded on the video tape 80 from the fact that the video tape 80 has entered the locked state in which the tape is driven at the predetermined tape traveling speed, and the recording start timing information is generated. For example, the control section 26 generates an initial value of a decremental count as the recording start timing information, the decremental count indicating the number of frames preceding the frame at which recording is to be started.

At step ST4, the control section 26 exercises control over the operation of starting recording. The control section 26 controls the operation of the recording/reproduction process section 22 to start recording the image on the video tape 80 at timing which is based on the recording start timing information. In order to cause the recorder 30 to record the same image in the memory card 85 in synchronism with the recording of the image on the video tape 80, the control section 26 supplies the recording start timing information to the output process section 23 to output the information along with the HD-SDI signal from the output process section 23 on a multiplex basis.

As described above, the control section 26 generates the decremental count indicating the number of frames preceding the frame at which the recording of the image is to be started, as the recording start timing information. The control section 26 decrements the decremental count or the number of frames from the initial value and causes the image to be recorded on the video tape 80 starting with the frame at which the decremental count reaches "0". The output process section 23 also provides the HD-SDI signal with the decremental count on a multiplex basis. When the decremental count representing the number of frames preceding the beginning of image recording is provided with the HD-SDI signal on a multiplex basis as thus described, the recorder 30 can determine that the image is to be recorded on the video tape 80 after the frames indicated by the decremental count are supplied. Therefore, the recorder 30 can makes preparations for allowing the image to be recorded in the memory card 85 in synchronism with the recording of the image on the video tape 80.

At step ST5, the control section 26 determines whether recording has been terminated or not. When the control section 26 determines that a recording terminating operation has been performed based on an operation signal from the operation section 27, the flow proceeds to step ST6. When the recording terminating operation has not been detected, step ST5 is repeated.

At step ST6, the control section 26 issues a "STOP" command. The control section 26 supplies the "STOP" command to the recording/reproduction process section 22, the output process section 23, and the tape driving section 24. When the "STOP" command is supplied, the recording/reproduction process section 22 stops recording the image on the video tape 80. For example, the section stops recording the image at the frame supplied immediately after the "STOP" command. The tape driving section 24 steps driving the tape, for example, after the recording of the image on the video tape 80 is stopped. In response to the "STOP" command, the output process section 23 provides recording termination information for terminating the recording of the image in the memory card 85 along with the HD-SDI signal on a multiplex basis. For example, when the "STOP" command is issued, recording termination information is added at the beginning of the frame provided immediately after the command on a multiplex basis.

At step ST11 shown in FIG. 5, the control section 33 acquires information provided on a multiplex basis. The control section 33 acquires information extracted from the HD-SDI signal by the input process section 31, and the flow proceeds to step ST12.

At step ST12, the control section 33 makes preparations for recording based on the extracted information. The control section 33 makes preparation for recording of the image based on the extracted information, e.g., the initial and decrementing values of the decremental count, and the flow proceeds to step ST13.

At step ST13, the control section 33 starts a recording operation. The control section 33 controls the recording process section 32 based on the recording start timing information to record the image in the memory card 85 in synchronism with the recording of the image on the video tape 80 performed by the video camera 20. For example, control section 33 causes the recording of the image in the memory card 85 to be started from the frame at which the decremental count becomes "0", and proceeds to step ST14.

At step ST14, the control section 33 determines whether recording has been terminated or not. When recording termination information is extracted, the control section 33 proceeds to step ST15. When recording termination information is not extracted, the step ST14 is repeated.

At step ST15, the control section 33 terminates the recording operation. The control section 33 controls the recording process section 32 to terminate the recording of the image in the memory card 85.

As described above, the recording start timing information of the image is supplied to the recorder 30 along with the HD-SDI signal on a multiplex basis before the video camera 20 starts recording the image on the video tape 80. Therefore, the recorder 30 can make preparations for recording according to the timing at which the video camera 20 will starts recording the image. Further, when the recording of the image on the video tape 80 is started, the recorder 30 can record the image in the memory card 85 in synchronism with the recording of the image on the video tape based on the recording start timing information. Since recording termination information is provided to the recorder 30 when the recording of the image on the video tape 80 is terminated, the recording of the image in the memory card 85 can be terminated in synchronism with the termination of recording of the image on the video tape 80.

The transmission of information will now be described. The following description is directed to the case where information is transmitted using a user bit area in time information multiplexed with the HD-SDI signal, such as VITC (Vertical Interval Time Code).

Figures 6A, 6B:
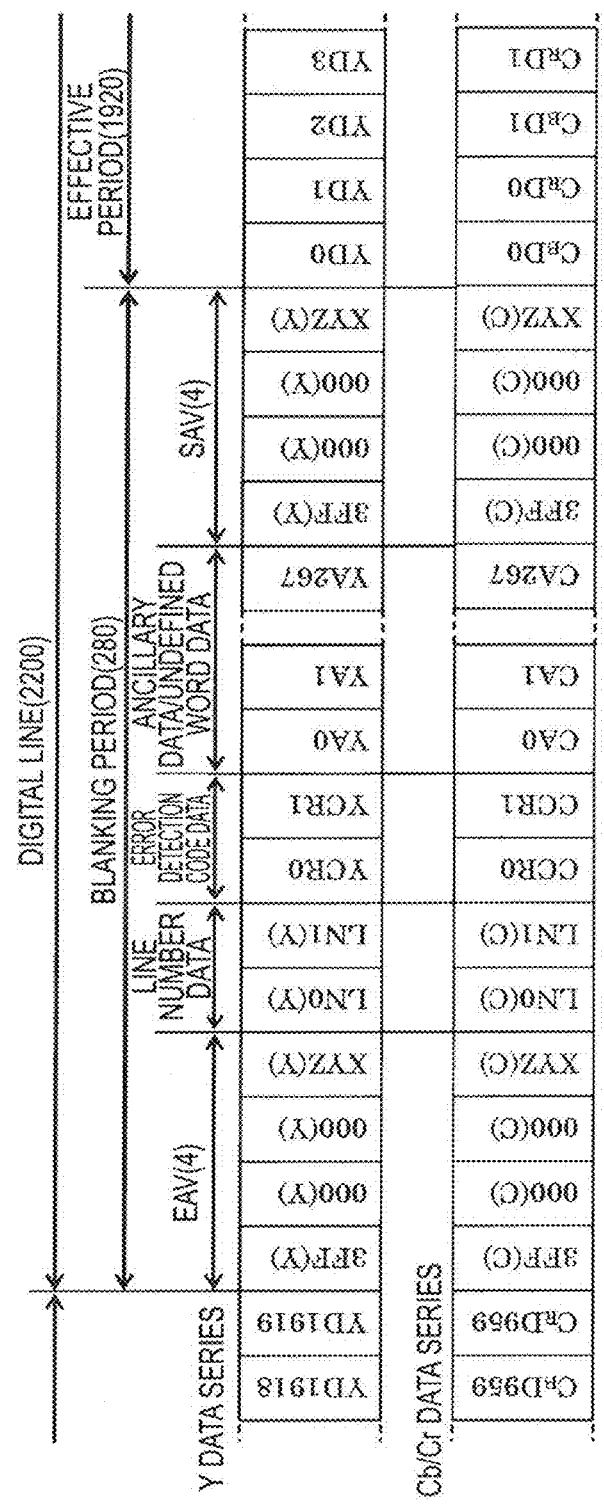
FIGS. 6A and 6B are illustrations showing a blanking period of one line of an HD-SDI signal.

FIGS. 6A and 6B illustrate blanking periods in one line of the HD-SDI signal. FIG. 6A shows a blanking period of a series of luminance signal data (Y data series), and FIG. 6B shows a blanking period of a series of chrominance signal data (PB/PR data series). For example, word data constituting each item of the Y data series and the PB/PR data series is formed by ten bits.

Timing reference code data EAV (End of Active Video) constituted by four words, line number data constituted by two words, error detection code data constituted by two words, 268 words worth of an ancillary data area or undefined area, timing reference code data SAV (Start of Active Video) constituted by four words are provided in the blanking period. A packet of time information (hereinafter referred to as "time information packet") is provided in the ancillary data area or undefined area of the luminance signal data series.

Figure 7:
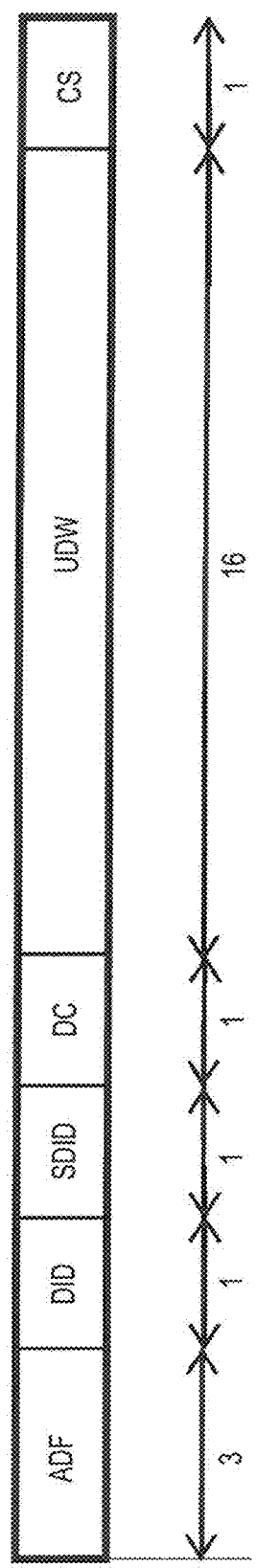
FIG. 7 is an illustration showing a structure of a time information packet.

For example, the time information packet has a structure as shown in FIG. 7. An "ADF (ancillary data flag word)" is an ancillary data flag indicating the beginning of an ancillary data packet. A "DID (data identification word)" and an "SDID (secondary data identification word)" are data identification flags. A DID or a combination of a DID and an SDID indicates the type of ancillary data to which the word or words are assigned. A "DC (data count)" indicates the word count of "UDW (user data words)" that is transmitted information, and a VITC is included in UDWs.

FIG. 8 shows a VITC configuration in compliance with SMPTE-12M standard. The 0th, 1st, 10th, and 11th bits of a VITC are synchronous with the 20th, 21st, 30th, 31st, 40th, 41st, 50th, 51st, 60th, 61st, 70th, 71st, 80th, and 81st bits of the code.

The 2nd to 5th bits constitute a frame information area representing the ones place of frame information. The 12th and 13th bits constitute a frame information area representing the tens place of the frame information. The 22nd to 25th bits constitute a second information area representing the ones place of second information. The 32nd to 34th bits constitute a second information area representing the tens place of the second information. The 42nd to 45th bits constitute a minute information area representing the ones place of minute information. The 52nd to 54th bits constitute a minute information area representing the tens place of the minute information. The 62nd to 65th bits constitute an hour information area representing the ones place of hour information. The 72nd and 73th bits constitute an hour information area representing the tens place of the hour information. The 6th to 9th bits, 16th to 19th bits, 26th to 29th bits, 36th to 39th bits, 46th to 49th bits, 56th to 59th bits, 66th to 69th bits, and 76th to 79th bits constitute user bit areas. The 35th and 55th bits constitute flag areas.

The output process section 23 of the video camera 20 adds information to user bit areas of a time information packet on a multiplex basis. For example, pieces of information "DATA0" to "DATA4" may be provided on a multiplex basis. Data represented by the four least significant bits of the data "DATA0" are provided in the user bit area constituted by the 6th to 9th bits on a multiplex basis, and data represented by the four most significant bits of the data "DATA0" are provided in the user bit area constituted by the 16th to 19th bits on a multiplex basis. Data represented by the four least significant bits of the data "DATA1" are provided in the user bit area constituted by the 26th to 29th bits on a multiplex basis, and data represented by the four most significant bits of the data "DATA1" are provided in the user bit area constituted by the 36th to 39th bits on a multiplex basis. Data represented by the four least significant bits of the data "DATA2" are provided in the user bit area constituted by the 46th to 49th bits on a multiplex basis, and data represented by the four most significant bits of the data "DATA2" are provided in the user bit area constituted by the 56th to 59th bits on a multiplex basis. Data represented by the four least significant bits of the data "DATA3" are provided in the user bit area constituted by the 66th to 69th bits on a multiplex basis, and data represented by the four most significant bits of the data "DATA3" are provided in the user bit area constituted by the 76th to 79th bits on a multiplex basis.

Table 1 shows a structure of the pieces of data "DATA0" to "DATA4" provided on a multiplex basis. The data "DATA0" is command data. The command data includes the total length of the transmitted data, a command, data associated with the command, and a checksum. The data "DATA1" indicates the place that the command data occupies in the entire data series transmitted. The data "DATA2" indicates information on operations of the video camera 20 and recording start timing information. The data "DATA3" is a reserved area.

TABLE 1

| DATA0 | COMMAND DATA |
| DATA1 | COMMAND DATA COUNT |
| DATA2 | VTR STATUS/REC COUNTER |
| DATA3 | RESERVED |

Table 2 shows exemplary bit allocation of the data "DATA2". Two bits, i.e., bits 5 and 4 of the data "DATA2" represent a state of operation. For example, when the video camera 20 is disabled from recording of an image (or in an idle state), the two bits, i.e., the bits 5 and 4 are set at "11(0x3)". When the video camera is recording an image (or in a "REC" state), the two bits, i.e., the bits 5 and 4 are set at "00(0x0)". When a image recording starting operation is performed to put the video camera 20 in a state of preparation for recording of the image (hereinafter referred to as "SRS (Start Rec Sequence)" state), the two bits, i.e., the bits 5 and 4 are set at, for example, "01(0x1)". Further, when the two bits, i.e., the bits 5 and 4 are set at "01(0x1)", the value represented by three bits, i.e., bits 2, 1 and 0 is a decremental count indicating frames preceding the frame at which the recording of the image is to be started.

TABLE 2

| Rec sequence (bit 5 . . . 4) | Rec sequence (bit 2 . . . 0) | Description |
| --- | --- | --- |
| 0x3 | 0x7 | STOP |
| 0x1 | 0x7 | PRE REC (TAPE START RUN) |

TABLE 2-continued

| Rec sequence (bit 5 . . . 4) | Rec sequence (bit 2 . . . 0) | Description |
| --- | --- | --- |
| 0x1 | 0x6 | COUNT DOWN START |
| . | . | . |
| . | . | . |
| . | . | . |
| 0x1 | 0x1 | |
| 0x0 | 0x0 | RECORDING |

FIG. 9 shows exemplary values that the data "DATA2" has during the period from the beginning of recording until the end of recording. When the video camera 20 is disabled from recording of the image, the control section 26 sets the bits 5 and 4 of the data "DATA2" at "11(0x3)". The control section 26 sets the bits 2, 1 and 0 such that they represent an initial value of a decremental count. For example, the bits 2, 1, and 0 are set at "111(0x7)" to set the initial value of the decremental count at "7".

When the image recording starting operation has been performed to put the video camera in the SRS state, the control section 26 sets the bits 5 and 4 of the data "DATA2" at "01(0x1). Since recording of the image is not started until it can be performed in synchronism with the driving of the tape, the bits 2, 1, and 0 are kept at the initial value of the decremental count.

When recording of the image is thereafter enabled because it can be performed in synchronism with the driving of the tape, the control section 26 decrements the decremental count. The control section 26 causes recording of the image on the video tape 80 to be started from the frame at which the decremental count becomes "0" by setting the bits 5 and 4 of the data "DATA2" at "00(0x0)".

When an image recording terminating operation is performed, the control section 26 provides image recording termination information by setting the bits 5 and 4 of the data "DATA2" at "11(0x3)".

When the data "DATA2" is generated and provided along with the HD-SDI signal on a multiplex basis as thus described, the recorder 30 can be notified of the timing at which the video camera 20 starts recording the image by the decremental value represented by the bits 2, 1, and 0 of the data "DATA2". Therefore, the recorder 30 can make preparations for recording of the image according to the timing at which the video camera 20 starts recording the image. Further, the recorder 30 records the image starting with the frame at which the decremental count becomes "0". Thus, the video camera 20 and the recorder 30 can start recording the image in synchronism with each other.

When the video camera 20 is in the SRS state, the bits 5 and 4 of the data "DATA2" are set at "01(0x1)". The recorder 30 can determine that the video camera 20 is in the SRS state from the changes in the values of the bits 5 and 4 of the data "DATA2" from "11(0x3)" to "01(0x1)". Thus, it is possible to determine that the video camera 20 is making preparations for recording not only from the bits 2, 1, and 0 of the data "DATA2" but also from the bits 5 and 4 of the data. As a result, even when it takes a longer time for the recorder 30 to make preparations for recording than the period indicated by the bits 2, 1, and 0, the recorder can makes preparations for recording also based on the information represented by the bits 5 and 4 of the data "DATA2". Thus, the recorder can complete the preparations for recording before the video camera 20 starts recording the image. Since the bits 5 and 4 of the data "DATA2" are used as thus described in addition to the bits 2, 1, and 0, the recorder 30 can start recording the image in more reliable synchronism with the video camera 20.

Further, the recorder 30 can determine that the video camera 20 has terminated the recording of the image from the changes in the values of the bits 5 and 4 of the data "DATA2" from "00(0x0)" to "11(0x3)". Therefore, the recorder 30 can terminate the recording of the image in synchronism with the termination of the recording by the video camera 20.

<5. Operation of Recording Non-Image Data>

The video tape used in the video camera 20 is removable. Therefore, it may become difficult to find a video tape having video content recorded thereon associated with an edition list based on images recorded in the memory card 85 unless video tapes 80 are properly managed in association with the content of the memory card 85.

A description will now be made on an operation of recording non-image data involving a process of providing identification information uniquely assigned to the video tape 80 along with the HD-SDI signal on a multiplex basis.

Figure 10:
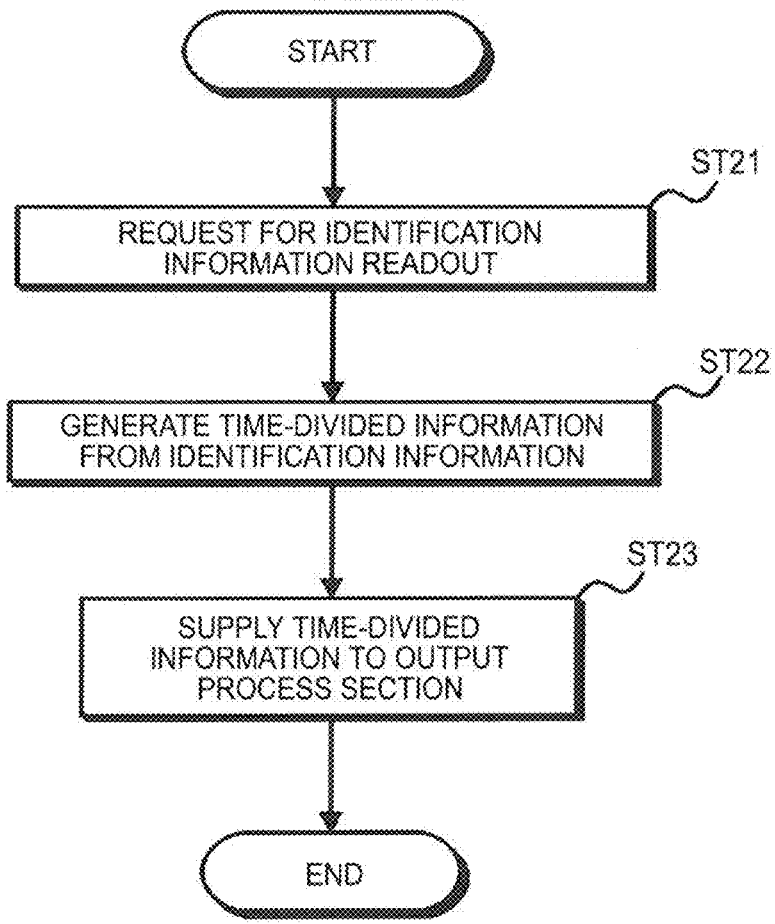
FIG. 10 is a flow chart showing operations of the video camera performed when multiplexing identification information of a video tape with an HD-SDI signal.
Figure 11:
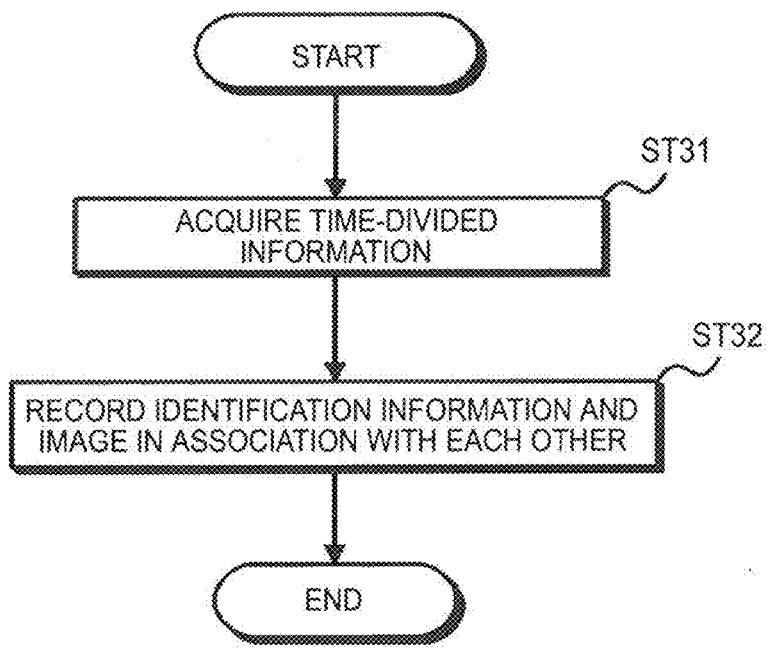
FIG. 11 is a flowchart showing operations of the recorder performed when receiving the HD-SDI signal multiplexed with identification information and recording an image.

FIG. 10 is a flow chart showing operations of the video camera 20 performed to provide the identification information of a video tape 80 along with an HD-SDI signal on a multiplex basis. FIG. 11 is a flow chart showing operations of the recorder 30 performed to receive the HD-SDI signal accompanying the identification information on a multiplex basis and recording the image.

When it is determined by the tape driving section 24 that a video tape 80 is mounted in the video camera 20, the control section 26 makes an identification information readout request at step ST21. Specifically, when a detection signal indicating that the video tape has been mounted is supplied from the tape driving section 24, the control section 26 requests the identification information reading section 25 to read out identification information, and the flow proceeds to step ST22. Upon receipt of the identification information readout request, the identification information reading section 25 reads out the identification information uniquely set for the video tape 80 and outputs the identification information thus read to the control section 26.

At step ST22, the control section 26 generates time-divided information from the identification information. The control section 26 generates the time-divided information from the identification information in order to transmit the identification information along with the DH-SDI signal on a multiplex basis. The control section 26 generates time-divided information from the identification information such that the identification information can be transmitted, for example, in the form of information "DATA0", and the flow proceeds to step ST23.

At step ST23, the control section 26 supplies the time-divided information thus generated to the output process section. The output process section 23 sequentially multiplexes the time-divided information supplied from the control section 26 with a time information packet or writs the information "DATA0" in a user bit area of the packet.

AT step ST31 shown in FIG. 11, the control section 33 acquires the time-divided information supplied on a multiplex basis. The time-divided information multiplexed with the HD-SDI signal is extracted by the input process section 31. The control section 33 acquires the time-divided information extracted by the input process section 31, and the flow proceeds to step ST32.

At step ST32, the control section 33 records the identification information with the image. The control section 33 restores the identification information from the time-divided information extracted by the input process section 31. Further, the control section 33 records the restored identification information in association with the image data such that the video tape 80 having the same image as the image recorded in the memory card 85 can be identified.

Table 3 shows an exemplary configuration of the information "DATA0" and "DATA1". When time-divided information is included in the information "DATA0", the information "DATA0" represents a data length, information allowing the type of the time-divided information to be identified, the time-divided information to be transmitted, and an error detection code. The information "DATA1" indicates the place that the data "DATA0" occupies in the data series of interest.

TABLE 3

| DATA1 | DATA0 | Description |
|---|---|---|
| 0 | N | entire length of the transmitted data |
| 1 | CMD1 | the combination of CMD1 and CMD2 |
| 2 | CMD2 | represents a command (CMD1 and CMD2 are set at 0x22 and 0x88 to represent ID of TELE-FILE) |
| 3 | DATA [0] | data identified by CMD1 and CMD2 |
| . | . | . |
| . | . | . |
| . | . | . |
| N − 2 | DATA [M] | final item of the data (M = N − 4) |
| N − 1 | checksum | value that makes the sum of values of DATA3 associated with values of DATA2 ranging from 0 to N − 1 equal to 0 (checksum). |

Figure 12:
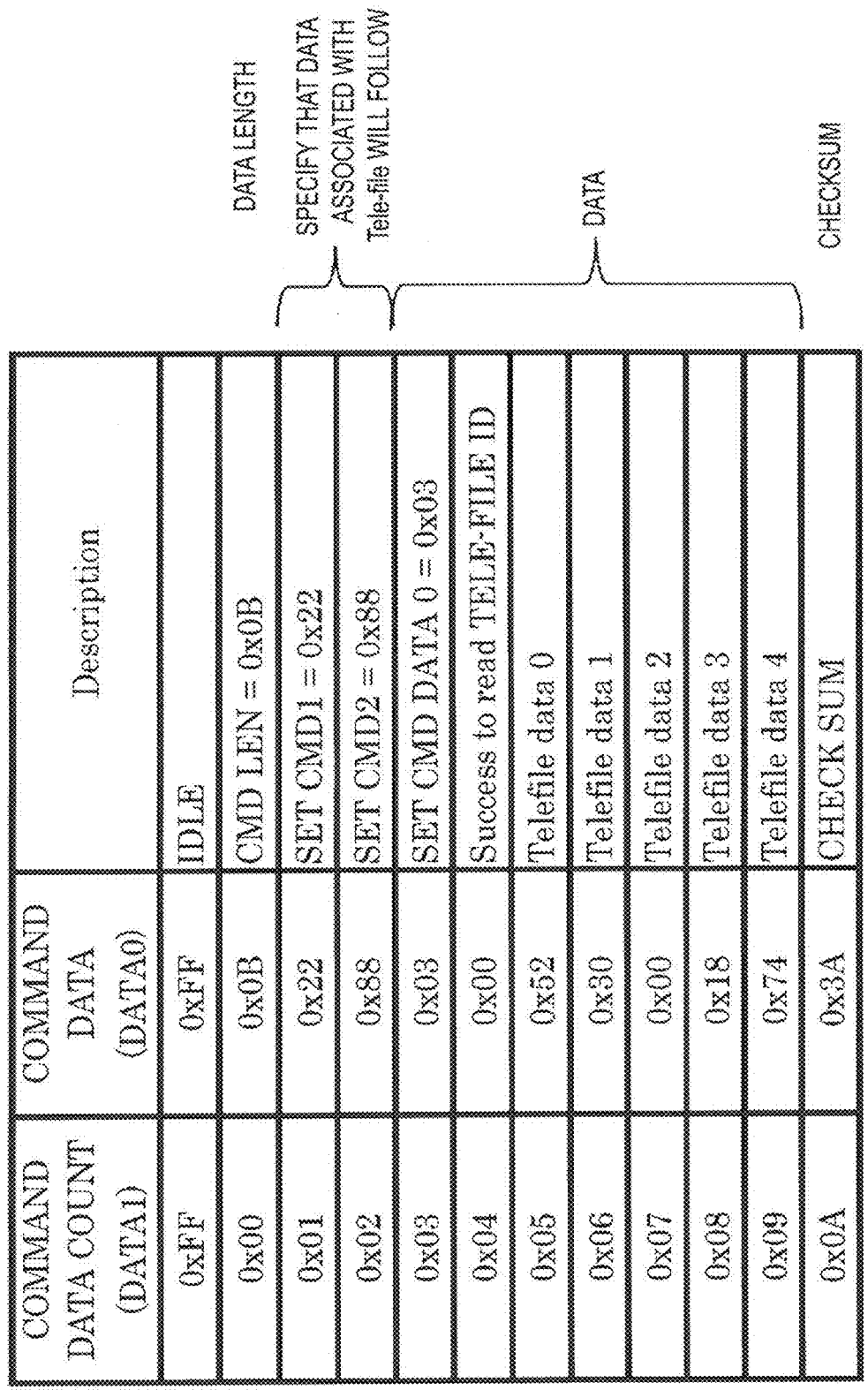
FIG. 12 is a table showing specific examples of values that data "DATA0" and "DATA1" have in a case wherein identification information is provided on a multiplex basis.

FIG. 12 shows specific examples of values that the data "DATA0" and "DATA1" have in a case wherein identification information is provided on a multiplex basis. In the case shown in FIG. 12, the video tape 80 has a label reading "TELE-FILE (registered trademark), and identification information "5230001874" is read out from the label through contactless communication. The control section 26 generates time-divided information based on the identification information. For example, the information listed in FIG. 12, i.e., the pieces of information from "data length" up to "checksum" are generated and output to the output process section 23 as time-divided information.

The control section 26 sets each of the data "DATA0" and "DATA1" at "0xFF".

To provide the time-divided information on a multiplex basis, initially, the control section 26 sets items of the data "DATA0" as information representing a data length (CMD LEN). For example, the data length of the time-divided information is 11 bytes, an item of data "CMD LEN=0x0B" is set. A first item of the data "DATA1" is set as "0x00" is set. Therefore, the data "DATA1" represents time-divided pieces of information ranging from "0x00" to "0x0A".

The control section 26 identifies the time-divided information by items of data which follow the data indicating the data length. For example, when identification information of a TELE-FILE is transmitted, items of the data "DATA0" are set as "SET CMD1=0x22" and "SET CMD2=0x88".

The control section 26 represents start data indicating the start of the identification information and a flag indicating that the identification information has been successfully read from the video tape, the start data and the flag being represented by items of data which follow the data identifying the time-divided information. For example, the control section 26 sets items of the data "DATA0" as "SET CMD DATA0=0x03" and "Success to read TELE-FILE ID=0x00".

The control section 26 represents time-divided information indicating the identification information using items of data which follow the start data and the flag. For example, when the identification information is "5230001874", the control section 26 sets items of the data "DATA0" as "Telefile data 0=0x52", "Telefile data 1=0x30, "Telefile data 2=0x00", "Telefile data 3=0x18", and "Telefile data 4=0x74".

The control section 26 represents a checksum using the last item of data. For example, the checksum has such a value that the sum of the values of the items of the data "DATA0" from the information representing the data length at the beginning of the time-divided information up to the checksum at the end becomes 0. Therefore, in the case of the data shown in FIG. 12, the checksum of the data "DATA0" is "0x3A".

As thus described, when an image is recorded on a video tape 80 by the video camera 20, identification information unique to the tape is provided to the recorder 30. It is therefore possible to identify a video tape having the same image as recorded by the recorder 30.

<6. Exemplary Sequence of Operations from Beginning of Recording up to End of Recording>

FIG. 13 shows an exemplary sequence of operations from the beginning of recording up to the end of recording. No recording operation is performed and no identification information is acquired before a video tape 80 is inserted into the video camera 20 at a time t1. Therefore, the control section 26 causes the information indicating that recording is not in progress to be multiplexed with an HD-SDI signal at the output process section 23. Specifically, the control section 26 causes the data "DATA2" and the HD-SDI signal to be multiplexed with the bits 5 and 4 of the data set at "0x03".

When the insertion of a video tape 80 into the video camera 20 is detected by the tape driving section 24 at the time t1, the tape driving section 24 outputs a detection signal to the control section 26.

When it is determined that a video tape 80 has been inserted from the detection signal thus supplied, the control section 26 requests the identification information reading section 25 to read identification information uniquely set for the video tape 80 inserted. The identification information reading section 25 reads the identification information from the video tape 80 and outputs the identification information to the control section 26.

The control section 26 generates time-divided information based on the identification information supplied from the identification information reading section 25 and outputs the information to the output process section 23. Therefore, the HD-SDI signal is multiplexed with the identification information as shown in FIG. 12. The identification information may be repeatedly multiplexed with the signal until the video tape 80 is ejected. Thus, the identification information can be quickly read whichever part of the image recorded in the memory card 85 is reproduced. When the time-divided information is generated and supplied to the output process section 23, the control section 26 may set an initial value of a decremental count ("CNT=7" in FIG. 13) and may cause information indicating that image recording is not in progress ("IDLE" state) to be multiplexed with the HD-SDI signal at the output process section 23.

When the control section 26 determines that a start-recording operation has been performed at a time t2, the control section 26 outputs a "REC" command to the tape driving section 24. The control section 26 also causes the output process section 23 to multiplex information indicating that the apparatus is in a recording sequence starting state (SRS state) with the HD-SDI signal. Specifically, the control section 26 causes the data "DATA2" and the HD-SDI signal to be multiplexed with the bits 5 and 4 of the data set at "01(0x1)". The tape driving section 24 performs a tape driving operation according to the "REC" command supplied thereto. When the tape speed is locked at a predetermined speed, the tape driving section 24 outputs a lock notice to the control section 26.

When image recording is enabled and a lock notice is output at a time t3, the control section 26 starts decrementing the decremental count from the initial value. The initial value of the decremental count may be set when a decrementing operation is started.

At a time t4, the control section 26 performs a decrementing operation to change the decremental count from "CNT=7" to "CNT=6" and causes the decremental count to be multiplexed with the HD-SDI signal at the output process section 23. That is, the control section 26 causes the data "DATA2" and the HD-SDI signal to be multiplexed with the bits 2, 1, and 0 of the data set at "110(0x6)".

At a time t5 as the next frame, the control section 26 performs a decrementing operation to change the decremental count from "CNT=6" to "CNT=5" and causes the decremental count to be multiplexed with the HD-SDI signal at the output process section 23. That is, the control section 26 causes the data "DATA2" and the HD-SDI signal to be multiplexed with the bits 2, 1, and 0 of the data set at "101(0x5)".

The control section 26 thereafter performs decrementing operations similarly. At a time t6 when the image of interest comes to the frame at which the decremental count "CNT" becomes 0, the data "DATA2" is multiplexed with the HD-SDI signal with the bits 5 and 4 of the data set at "00(0x0)" to indicate that the apparatus is in a recording ("REC") state. The control section 26 causes the recording of the image on the video tape 80 to start.

The recorder 30 can determine that preparations for image recording are being made at the video camera 20 and determine the timing at which image recording will be started by the video camera 20 from the pieces of information multiplexed with the HD-SDI signal. Therefore, the recorder 30 can make preparations for image recording before the video camera 20 starts recording the image. The recorder 30 starts recording the image when the decremental count becomes "CNT=0" with the bits 5 and 4 of the data "DATA2" set at "00(0x0)" to indicate that the apparatus is in the recording state. Thus, the recorder 30 can start recording the image in the memory card 85 at the same frame from which the image is recorded on the video tape 80.

Thereafter, when the control section 26 determines that a "STOP" operation is performed at a time t7, the control section 26 controls the operation of the recording/reproduction process section 22 to disable the recording of the image on the video tape 80 at a time t8 which is the beginning of the next frame. Further, the control section 26 multiplexes the data "DATA2" and the HD-SDI signal with the bits 5 and 4 of the data and the bits 2, 1, and 0 of the data set at "11(0x3)" and "111(0x7)", respectively.

The reorder 30 stops recording the image when it is determined that the information multiplexed with the HD-SDI signal has been changed from information indicating a recording state to information indicating a recording-stopped state. Therefore, the recording of the image on the video tape 80 and the memory card 85 can be stopped at the same frame of the image.

Further, since an HD-SDI signal is multiplexed with identification information of each video tape 80, when an image is recorded in the memory card 85 in association with such information, a video tape 80 having the same image as recorded in the memory card can be easily identified. When images are selected and combined using the editing apparatus 60 based on list data generated by the editing apparatus 50, it is easy to identify the video tape having recorded images associated with the list data. Therefore, even when the editing apparatus 50 and 60 perform editing processes in parallel, it is possible to generate video data which properly reflects results of the edition.

The present disclosure has been detailed above with reference to a particular embodiment of the same. Obviously, modifications and alterations can be made to the embodiment by those skilled in the art without departing from the spirit of the present disclosure. While the above embodiment has been described as an instance in which an image is recorded on a video tape and a memory card, the present disclosure is not limited to such recording media, and an image may be recorded in a disc-shaped recording medium or the like. The present disclosure is not limited to the mode in which an HD-SDI signal is output from the video camera 20, and signals in other formats such as SDI signals may be output from the camera. Further, recording start timing information and the like may be multiplexed in positions other than the positions described in the above embodiment. The present disclosure is not limited to the use of a video camera and a recorder as image recording apparatus. The above-described embodiment is an exemplary mode of carrying out the present disclosure, and the embodiment is not to be taken in a limiting sense. The gist of the present disclosure herein should be understood from the summary of the present disclosure.

An image recording apparatus for recording and outputting an image in and from a recording medium of the present disclosure outputs an image along with information on the timing for starting recording of the image multiplexed therewith before starting to record the image on a recording medium. When the image multiplexed with the recording start timing information is input to another imaging recording apparatus, the image recording apparatus starts recording the image in a recording medium in synchronism with the image recording operation of the apparatus which has output the image based in the recording start timing information multiplexed with the image. Thus, when an image is recorded by a plurality of apparatus, the apparatus can record the image in synchronism with each other. Therefore, the image recording apparatus are advantageously used in an image recording system in which an editing process is performed in parallel with image recording.

The present disclosure contains subject matter related to that disclosed in Japanese Priority Patent Application JP 2011-010782 filed in the Japan Patent Office on Jan. 21, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image recording apparatus comprising:
a recording process section recording an image on first recording medium;
an output process section outputting the image to a second recording medium; and
a control section multiplexing recording start timing information of the image with the image output from the output process section before the recording process section starts recording the image on the first recording medium,
wherein the image is recorded on the second recording medium and the first recording medium in parallel and starting from a same frame, and the second recording medium also records identification information of the first recording medium, and
wherein the control section determines the start of recording the image on the first recording medium as the time when the first recording medium is driven at a predetermined speed.

2. An image recording apparatus according to claim 1, wherein the recording start timing information is information indicating a period to precede the recording of the image.

3. An image recording apparatus according to claim 2, wherein the recording start timing information is information indicating the number of frames of the image updated as time passes before the recording of the image is started.

4. An imaging recording apparatus according to claim 1, wherein the recording start timing information is information indicating that the apparatus is in a state of preparation for recording the image.

5. An image recording apparatus according to claim 1, wherein the output process section outputs a video signal in compliance with the serial digital interface standard as the output image.

6. An image recording apparatus according to claim 5, wherein the control section multiplexes the recording start timing information with a blanking period of the video signal.

7. An image recording apparatus according to claim 6, wherein the control section multiplexes the recording start timing information using a user bit area of time code information multiplexed with the blanking period.

8. An image recording apparatus according to claim 1, wherein the control section multiplexes information indicating the termination of the recording of the image with the image output from the output process section when the recording of the image on the first recording medium is terminated.

9. An image recording apparatus according to claim 1, further comprising an identification information reading section reading unique identification information set for the first recording medium for recording the image, the identification information being read from the recording medium,
wherein the control section multiplexes the read identification information with the image output from the output process section.

10. An image recording apparatus according to claim 9, wherein the control section generates time-divided information from the read identification information and multiplexes the time-divided information with the image output from the output process section.

11. An image recording control method comprising:
recording an image on a first recording medium;
outputting the image to a second recording medium; and
multiplexing recording start timing information of the image with the output image before the recording of the image on the first recording medium is started,
wherein the image is recorded on the second recording medium and the first recording medium in parallel and starting from a same frame, and the second recording medium also records identification information of the first recording medium, and
wherein the multiplexing step determines the start of recording the image on the first recording medium as the time when the first recording medium is driven at a predetermined speed.

12. An image recording apparatus comprising:
an input process section extracting recording start timing information multiplexed with an input image, the recording start timing information indicating timing for starting the recording of the image at an image output apparatus which has output the image, the start of recording the image at the image output apparatus being represented by the time when the image output apparatus is driven at a predetermined speed;

a recording process section recording the input image in a second recording medium; and a control section controlling the operation of the recording process section based on the recording start timing information extracted by the input process section to record the input image in the second recording medium in parallel and starting from a same frame with the image recording operation of the image output apparatus, wherein the image is also recorded in a first recording medium of the image output apparatus, and wherein the image is recorded on the second recording medium and the first recording medium in parallel and starting from a same frame, and the second recording medium also records identification information of the first recording medium.

* * * * *